United States Patent [19]

Denisov et al.

[11] Patent Number: 4,957,512
[45] Date of Patent: Sep. 18, 1990

[54] METHOD OF CLEANING GAS FROM SOLID AND GASEOUS MATTER AND APPARATUS MATERIALIZING SAME

[76] Inventors: Vladimir F. Denisov, ulitsa B. Tulskaya, 2, kv. 547; Marina I. Gertseva, ulitsa Udaltsova, 4, kv. 188; Valentin E. Ziberov, ulitsa Voronezhskaya, 38/43, kv. 309, all of Moscow; Vadim K. Karapetian, ulitsa Kakhoiana, 6, kv. 33; Norik S. Sarkisian, ulitsa Komsomolskaya, 197, kv. 12, both of Alaverdy; Vladimir M. Karbachinsky, ulitsa Butlerova, 2, korpus 1, kv. 11, Moscow; Oleg I. Kharlamov, Leninsky prospekt, 125, korpus 2, kv. 240, Moscow; Alexei D. Tsoi, pereulok Vasnetsova, 11, kv. 158, Moscow; Mark I. Tsysin, Litovsky bulvar, 6, korpus 1, kv. 179, Moscow; Alexei A. Romanov, ulitsa Lenskaya, 3, korpus 2, kv. 423, Leningrad; Vagan D. Veranian, 1 kvartal, 13, kv. 14, Alaverdy, poselok Sanain; Vasily D. Khripin, Moskovskoe shosse, 39, korpus 4, kv. 13, Ryazan; Larisa E. Shafran, Leningradsky prospekt, 75b, kv. 12I, Moscow, all of U.S.S.R.

[21] Appl. No.: 398,670

[22] Filed: Aug. 25, 1989

[51] Int. Cl.$^5$ ............................................. B03C 1/00
[52] U.S. Cl. ......................................... 55/8; 55/122; 55/94; 55/223

[58] Field of Search .......................... 55/6–10, 55/89, 94, 122, 223, 227

[56] References Cited

U.S. PATENT DOCUMENTS

| | | | |
|---|---|---|---|
| 4,152,123 | 5/1979 | Hegemann et al. | 55/89 X |
| 4,194,889 | 3/1980 | Wanner | 55/10 X |
| 4,469,493 | 9/1984 | Tuovinen et al. | 55/89 |
| 4,781,732 | 11/1988 | Wondrasch et al. | 55/10 |

Primary Examiner—Charles Hart
Attorney, Agent, or Firm—Burgess, Ryan & Wayne

[57] ABSTRACT

A method of cleaning gas from solid and gaseous matter is accomplished by a two-stage scrubbing of a gas flow with a liquid. For the first-stage scrubbing, the gas is admitted at a velocity of 30–40 m/s and is cooled in the course of scrubbing to the temperature of its adiabatic saturation. For the second-stage scrubbing, a flow of gas/liquid mixture is admitted at a velocity of 50–70 m/s, being then cooled at 40°–50° C. Electric precipitation of unwanted matter takes place at a field strength of 5–9 kV/cm. The velocity of the gas/liquid flow through the electric field is 3–4 m/s, and the cooling effect at this stage reduces the temperature of the gas/liquid mixture to 20°–25° C.

The apparatus which materializes the method of cleaning gases comprises means of scrubbing the gas, which are successively interconnected by a fluid flow and consist of a first means in the form of a scrubbing tower and a second means in the form of a Venturi tube, and at least one electric precipitator.

17 Claims, 7 Drawing Sheets

METHOD OF CLEANING GAS FROM SOLID AND GASEOUS MATTER AND APPARATUS MATERIALIZING SAME

FIELD OF THE INVENTION

The present invention relates to gas cleaning technology and has specific reference to methods of cleaning gas from solid and gaseous matter and apparatus materializing these methods.

The present invention can be of utility in non-ferrous metallurgy and the chemical industry.

BACKGROUND OF THE INVENTION

Widely known is a method of gas cleaning (A. G. Amelin "Sulphuric Acid Production Process" 1967, Khimiya Publishers, Moscow, pp. 135-136) pursuant whereto a gas is scrubbed with a 20-30% sulphuric acid at 60°-70° C. in a countercurrent flow in a single-stage packed tower formed wherein is a gas/liquid mixture. The acid channeled through the tower packing evaporates, and the gas cools down. Further cooling takes place in a shell-and-tube gas cooler. A condensate which forms therein drips from the tubes into a tank for collecting liquid mixture. The gas outflow passes through a first electric precipitator, another gas cooler and a second electric precipitator which are all successively interconnected. The droplets of mist comprising the gas/liquid mixture entering each of the electric precipitators absorb the ions of gas formed in the electric field, receive and electric charge and move towards collecting electrodes where they lose the charge and drip as a condensate film down the collecting electrodes into a tank for liquid mixture.

Alsoi widely known is an apparatus materializing the method of gas cleaning (A. G. Amelin "Sulphuric Acid Production Process", 1967, Khimiya Publishers, Moscow, pp. 135-136) comprising a scrubbing tower, pumps for feeding scrubbing fluid, a first gas cooler, a first electric precipitator, a second gas cooler and a second electric precipitator which are all connected in series by pipes.

The scrubbing tower is provided with nozzles at the top admitted wherethrough is a scrubbing fluid. A settling tank for separating solid matter from liquid and a tank for collecting the scrubbing fluid are provided at the bottom of the tower. The gas coolers are of the shell-and-tube type, the cooling water passing through the tubes. Each of the electric precipitators consists of a housing with gas inlet and outlet connections in a side wall and condensate and scrubbing fluid draining connections at the bottom. A header with nozzles fed wherethrough is an electrode-flushing fluid is provided at the top. Vertical collecting electrodes of the tubular type are provided inside the housing, being fitted to a busher connected to a source of power. Coaxial discharge electrodes in the form of wires held taut by weights at their lower ends are provided in the bores of the collecting electrodes. The discharge electrodes are connected to a frame provided at the top of the housing.

The countercurrent flow of the gas and scrubbing fluid through the scrubbing tower fails to make for an adequate heat and mass transfer between the gas and fluid, impairing cleanliness of the gas. Solids settle on the cooling surface of the gas cooler, reducing the rate of heat transfer and impairing cleanliness. The velocity of the gas flow through the scrubbing tower and electric precipitators is low so that large-volume equipment is required for good results. Nonuniform wetting of the suspended matter not only has an adverse effect on the scrubbing process but increases the friction losses in the scrubbing tower and the power requirements for inducing the gas flow.

Also known is a method of gas cleaning (B. T. Vasiliev, M. I. Otvagina "Sulphuric Acid Technological Process" 1985, Khimiya Publishers, Moscow, pp. 288-289) according whereto a gas containing 7-8% sulphur dioxide is scrubbed with sulphuric acid in two stages. The first-stage scrubber is a Venturi tube with a cocurrent flow pattern. The gas admitted into the Venturi tube at a velocity of 40-50 m/s disperses the scrubbing fluid into droplets. This surface of contact between the gas and scrubbing fluid increases, and the gas cools down to the temperature of its adiabatic saturation. A sulphuric acid mist is formed; fumes of arsenic and selunium condense and coagulate, being then precipitated by the droplets of the scrubbing fluid and dissolved in the sulphuric acid mist. The droplets of scrubbing fluid also precipitate dust.

The second-stage scrubbing is effected in a packed tower employing the countercurrent flow pattern. The gas/liquid mixture admitted into the tower at a velocity of 0.4-0.5 m/s contacts the scrubbing fluid at the wetted surface of the ceramic rings used as the packing material. The gas cools down to 30°-40° C. Further precipitation of the arsenic and selenium fumes takes place in the tower due to contact with the droplets of scrubbing fluid. Electric precipitation of the unwanted matter is effected at a field strength of 1-3 kV/cm, the velocity of the gas/liquid mixture flow being 0.8-1 m/s in the presipitator.

The ions of the gas which is ionized on the space between the collecting and discharge electrodes of the electric precipitator combine with the particles of condensed fumes of the unwanted matter and the charged particles settle at the collecting electrodes in the form of a liquid film which is disposed of from the precipitator.

Further known is also an apparatus which materializes the method of gas cleaning (V. T. Vasiliev, M. I. Otvagina "Sulphuric Acid Technological Process", 1985, Khimiya Publishers, Moscow, pp. 288-289) and comprises a Venturi tube, a packed scrubbing tower and two electric precipitators which are interconnected by a common fluid flow. The Venturi tube has consecutively located a convergent cone with nozzles admitted wherethrough is the scrubbing fluid, a throat and a divergent cone. The nozzles of the scrubbing tower are connected to pumps for feeding the scrubbing fluid and to a cooler. The Venturi tube and tower are connected by a fluid flow to a settling tank separating solids from the liquid. Each electric precipitator consists of a housing with gas inlet and outlet connection located at the top and bottom, respectively. A frame connected to a source of power is installed at the top of the housing. Perforated plates are fitted to a side wall of the housing at the top and bottom, and located between the plates and connected thereto are vertical tubular collecting electrodes. They are spaced from one another by a distance equalling 1.4 to 1.8 times their diameter. Coaxial discharge electrodes made of wire with a starry cross section are located in the bores of the collecting electrodes, being attached to the frame at the top and held taut by weights at the lower ends.

The countercurrent flow of the gas and scrubbing fluid in the packed tower fails to wet the packing material uniformly. This has an adverse effect on the rate of heat and mass transfer between the gas and scrubbing fluid and impairs cleanliness. The velocity of gas flow is low in the tower and its volume must be large. The metal requirements for manufacturing the towers and consequently high. The scrubbing of a gas with a variable content and volume is difficult, for, e.g. if the velocity and volume of the gas flow through the packed tower increases, the gas will contact the scrubbing liquid inside the void tower space rather than at the surface of the packing material. A heavy carry-over of the droplets of scrubbing liquid leading to an impaired cleanliness is unavoidable in this case. The electric precipitators operate at a low field strength (1–3 kV/cm), at a low velocity of the gas flow (0.6–0.8 m/s) and at a high gas temperature (30°–35° C.). The process variables cannot be increased in value due to wide gaps between the collecting and discharge electrodes and extending spacing of the longitudinal axes of the collecting electrodes. Widely spaced collecting electrodes reduce the surface precipitated whereat is the solid matter. This impairs cleanliness, especially that of dust-laden gases with a dust content of up to 0.2 g/m$^3$. The gas flow must be interrupted from time to time in order to flush the electrodes. This adds to the capital outlays and operational costs.

SUMMARY OF THE INVENTION

The principal object of the present invention is to achieve high cleanliness of the gas.

Another object of the present invention is to realize the cleaning of gases with a high solids content.

The essence of the invention is that in a method of cleaning gas from solid and gaseous matter—pursuant whereto a stream of gas is scrubbed with a liquid in two stages so that a stream of gas/liquid mixture is formed, the stream of gas/liquid mixture is cooled, a liquid phase containing solid matter is separated from the gas/liquid mixture and disposed of, and unwanted matter is electrically precipitated from the gas—according to the invention the two-stage scrubbing of the gas is effected in a cocurrent flow, whereby, for the first-stage scrubbing, the gas is admitted at a velocity of 30–40 m/s and is cooled there to the temperature of its adiabatic saturation; for the second-stage scrubbing, the gas/liquid mixture is admitted at a velocity of 50–70 m/s and the gas is cooled there to 40°–50° C.; and for the electric precipitation of the unwanted matter, which takes place at a field strength of 5–9 kV/cm, the gas/liquid mixture is admitted at a velocity of 3–4 m/s, and the gas is cooled there to 20°–25° C.

The essence of the invention also resides in the fact that in an apparatus which materializes the method of cleaning gas from solid and gaseous matter and incorporates a two-stage means of scrubbing the gas with a liquid and at least one electric precipitator successively interconnected by a common fluid stream, whereby one of the scrubbing means is a Venturi tube having inlet connections for the gas and scrubbing liquid at an upper end face and a gas outlet connection at a lower end and the electric precipitator has a housing with gas inlet and outlet connections at a top and bottom thereof, a frame which is fitted at the top of the housing and is electrically connected to a source of power, upper and lower perforated plates attached to a side wall of the housing at the top and bottom thereof, respectively, hollow cylindrical collecting electrodes which are earthed and attached to the upper and lower perforated plates vertically therebetween, cylindrical discharge electrodes conical at lower ends which are electrically connected to the frame and suspended therefrom in coaxial positions inside the bores of the collecting electrodes, according to the invention the gas stream is admitted before all into the means of scrubbing in the form of a scrubbing tower which is located upstream of the other means of scrubbing in the form of the Venturi tube, whereby the scrubbing tower has a gas inlet connection at an upper end face, a gas outlet connection at a bottom, a convergent cone attached to a side wall at a top of the tower, nozzles admitted wherethrough is the scrubbing liquid which are located in a side wall above a lower edge of the convergent cone and are directed downwards so as to make acute angles with a horizontal plane and in each of the electric precipitators the collecting electrodes are located so that their longitudinal axes are spaced apart 1.2–1.5 times the diameter of these electrodes; the discharge electrodes consist each of at least two identical cylindrical sections which are located one above the other, rigidly interconnected at end faces and have strips—of a rectangular outline at the upper cylindrical sections and of a trapeziform one at the lower cylindrical section—secured to the side surface of the cylindrical sections with their inward edges so as to make all the same angle with each other, whereby the strips of the adjacent cylindrical sections are displaced relative to each other in a horizontal plane and upper edges of the discharge electrodes are located below upper edges of the collecting electrodes at a distance 1.7–2.0 times the distance between the cylindrical walls of the collecting electrodes and outward edges of the rectangular strips of the discharge electrodes; the upper and lower perforated plates are secured together with the collecting electrodes so that an air-tight space containing a cooling agent is formed, between the side wall of the housing, the cylindrical walls of the collecting electrodes and the upper and lower perforated plates, which is provided with connections in the side wall of the housing between the upper and lower perforated plates for feeding and draining the cooling agent.

To provide for intermixing of the gas stream all the way down the gap between the collecting and discharge electrodes and a uniform distribution of the discharge over the entire length of the discharge and collecting electrodes, it is expedient to displace the strips of the adjacent cylindrical sections of the discharge electrodes relative to each other through an angle in a horizontal plane which equals half the angle the strips make with each other.

To increase the field strength between the collecting and discharge electrodes, it is also expedient that the ratio of the diameter of a circle formed by the outward edges of the rectangular strips of the upper cylindrical sections of the discharge electrodes to the diameter of the collecting electrodes is 0.28–0.84 in each of the electric precipitators.

To create conditions promoting uniform and strong electric discharge between the collecting and discharge electrodes, it is further expedient to provide each cylindrical section of the discharge electrodes of each electric precipitator in the form of two disks which are aligned with each other and on the cylindrical surfaces whereof there are strips attached thereto with their inward edges, whereby on the upper cylindrical sections of the discharge electrodes the ratio of the distance of the inward edges from the axis of the cylindrical sections to that of the outward edges from the same axis is 0.22–0.71.

To effect the cleaning of a gas with a high electric resistance, it is preferred that the outward edges of the strips of the cylindrical sections of the discharge electrodes are serrated, the pitch of the serrations being 0.2–0.5 times the distance between the collecting and discharge electrodes.

For a thorough agitation of the gas steam, it is also preferred to provide vane-type vortex generators in each electric precipitator which are located between the cylindrical sections of the discharge electrodes and consist each of a cylindrical rod located in alignment with the cylindrical sections of the discharge electrodes and having vanes attached to the cylindrical surface of the rod with their inward edges, whereby the diameter of a circle formed by the outward edges of the vanes of the vortex generator is less than the diameter of a circle formed by the outward edges of the rectangular strips of the cylindrical sections of the discharge electrodes.

A velocity of the gas stream of 30–40 m/s whereat it is admitted into the first-stage means of scrubbing in implementing the method of cleaning gas from solid and gaseous matter, enables the cleaning of gas with a solids content as high as 2 g/m$^3$. The second-stage scrubbing of the gas at a velocity of 50–70 m/s with the cooling to 40°–50° C. increases the efficiency of cleaning the gas from solid and gaseous matter. An increase in the electric field strength combined with a high volocity of the gas stream in the electric precipitator increases cleanliness of the gas.

BRIEF DESCRIPTION OF THE DRAWINGS

The present invention will now be explained by a detailed description of the method of cleaning gas from solid and gaseous matter and the apparatus for materializing this method which is given by way of example with reference to the accompanying drawings, wherein.

PREFERRED EMBODIMENTS OF THE INVENTION

The method of cleaning gas from solid and gaseous matter is materialized in the apparatus incorporating means 1, 2 (FIG. 1) for scrubbing the gas which are interconnected by a common fluid stream. The stream originates in the first scrubbing means 1 which is a scrubbing tower with a gas inlet connection 3 in an upper end face and a gas outlet connection 5 in a side wall 4 next to a bottom. A tank 6 for collecting liquid mixture is provided at a lower end face of the tower, and a convergent cone 7 is fitted to the side wall 4 of the scrubbing means 1 at a top thereof. At least three nozzles 9 admitted wherethrough is a scrubbing liquid are provided in the side wall 4 of the scrubbing means 1 above a lower edge 8 of the convergent cone 7, being spaced equidistantly appart all the way along the perimeter of the side wall 4 and directed downwards so as to make acute angles with a horizontal plane. A pipe 10 connects the nozzles 9 to a cooler 11 cooled wherein is the scrubbing liquid, and the cooler 11 is connected to a pump 13 by a pipe 12 fed wherethrough is the scrubbing liquid. The collecting tank 6 is connected by a pipe 14 to a settling tank 15 wherein solids are separated from liquid, and the settling tank is connected by a pipe to the pump 13.

Figure 1:
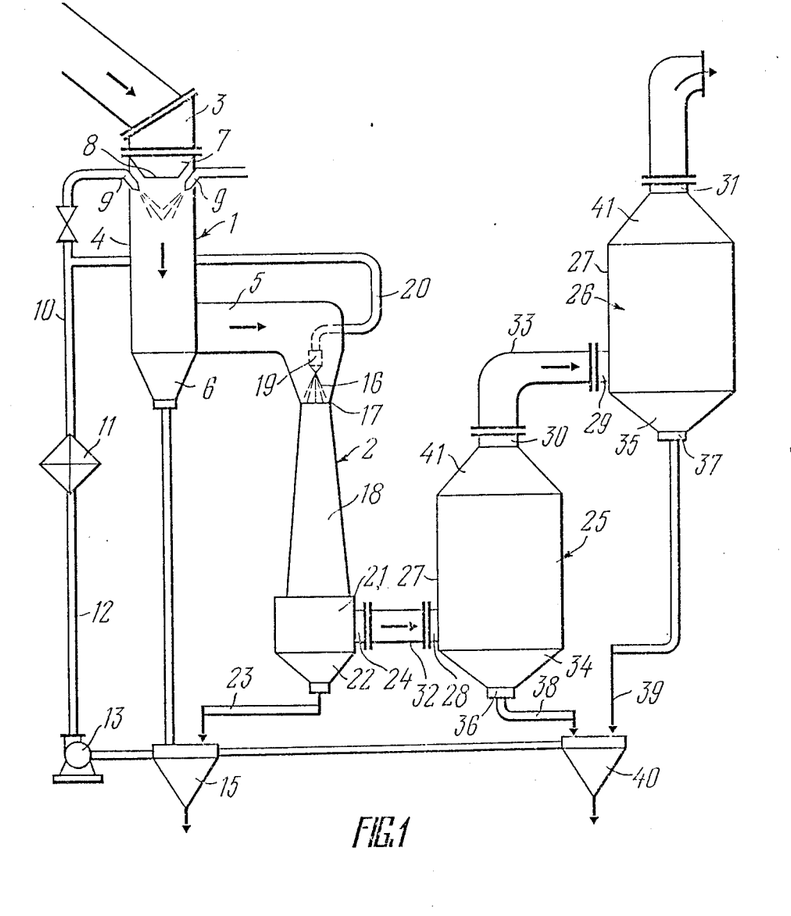
FIG. 1 is a schematic of the apparatus which materializes the method of cleaning gas from solid and gaseous matter according to the invention, illustrating the stages of fluid flow.

Downstream of the scrubbing means 1 there is located the means 2 of scrubbing the gas which is the Venturi tube consecutively arranged wherein are a convergent cone 16, a neck 17 and a divergent cone 18. A nozzle 19 fed wherethrough is the scrubbing liquid is located in the convergent cone 16 in a coaxial position relative to the means 2. The nozzle 19 is connected to the pump 13 through the pipes 20, 10, 12 and the cooler 11. Fitted to a lower edge of the divergent cone 18 of the scrubbing means 2 is a cylindrical moisture-eliminating chamber 21, and a lower edge thereof connects to a tank 22 for collecting liquid mixture which communicates with the settling tank 15 via a pipe 23. A gas oulet connection 24 is provided in a side wall of the moisture-eliminating chamber 21.

Downstream of the Venturi tube there are located consecutive electric precipitators 25, 26. The gas is admitted thereinto through connections 28, 29, respectively, which are provided in a side wall 27 of each housing. The gas outflow is through connections 30, 31, respectively, which are fitted at the top of each electric precipitator 25 and 26. The gas inlet connection 28 of the electric precipitator 25 is connected to the gas outlet connection of the scrubbing means 2 via a pipe 32. The gas inlet connection 29 of the electric precipitator 26 is connected to the gas outlet connection 30 of the electric precipitator 25 through a pipe 33. The outflow from the gas outlet connection 31 is delivered to the drying and adsorbing department of the sulphuric acid plant (not shown).

Tanks 34, 35 accumulated wherein is liquid mixture are fitted at the bottom of the electric precipitators 25, 26, respectively. The liquid mixture is drained from the tank 34 over a connection 36. The tank 35 is drained of the liquid mixture through a connection 37. The connections 36, 37 of the tanks 34, 35, respectively, communicate with a settling tank 40 over pipes 38, 39. The settling tank 40 is used to separate solids from liquid.

Each of the electric precipitators 25, 26 has a cover 41 with gas outlet connections 30, 31, respectively. A header 42 (FIG. 2) secured to the side wall 27 of the housing of each electric precipitator 25, 26 is provided with nozzles 43 admitted wherethrough is an electrode-flushing liquid which is fed into the header 42 over a pipe (not shown).

Figure 2:
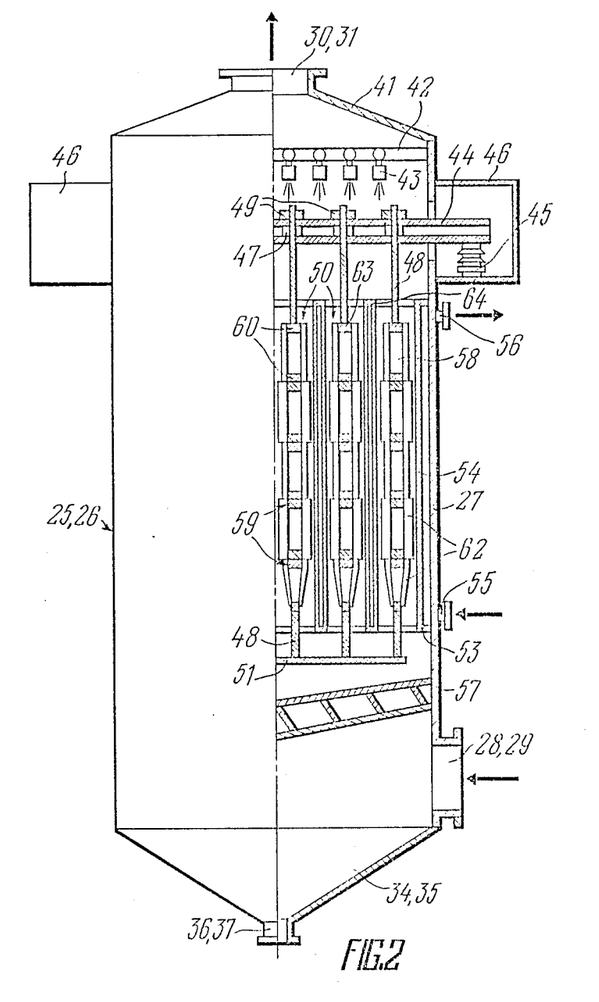
FIG. 2 is a sectional elevation of the electric precipitator according to the invention.

An upper frame 44 resting on insulators 45 of insulator boxes 46 and electrically connected to a source of power (not shown) is provided at the top of the side wall 27 of the housings of the electric precipitators 25, 26. The upper frame 44 has holes 47 fitting whereinto are rods 48 which are held fast to the upper frame 44 by nuts 49. The rods 48 provide support to discharge electrodes 50 and to a lower frame 51 which is fitted thereto at their lower ends. Lower and upper perforated plates 52, 53, rigidly attached whereto with their end faces are hollow cylindrical collecting electrodes 54, are attached to the side walls 27 of the housings of the electric precipitators 25, 26 at the top and bottom.

An air-tight space containing a cooling agent is provided between the side wall 27 of the housing, the cylindrical walls of the collecting electrodes 54 and the upper and lower perforated plates 52, 53. A coolant inlet connection 55 is located at the bottom of the side wall 27 of each housing of the electric precipitators 25, 26 between the upper and lower perforated plates 52, 53. A coolant outlet connection 56 is provided in the upper part of the housing.

The hollow cylindrical collecting electrodes 54 are installed vertically between the upper and lower perforated plates 52, 53. The coaxial discharge electrodes 50 are contained inside the collecting electrodes 54.

A distributing grid 57 directing the gas stream at an angle relative to the side wall 27 of the housings of the electric precipitators 25, 26 is provided for.

To increase the gas flow rate, the collecting electrodes 54 are arranged so that their longitudinal axes are spaced apart by a distance which is 1.2-1.5 times the diameter of the collecting electrodes 54.

Figure 5:
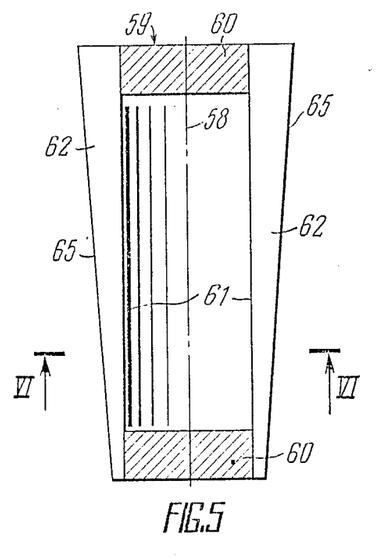
FIG. 5 is a sectional elevation of a lower cylindrical section of a discharge electrode of the electric precipitator with trapeziform strips according to the invention in the first embodiment thereof.
Figure 6:
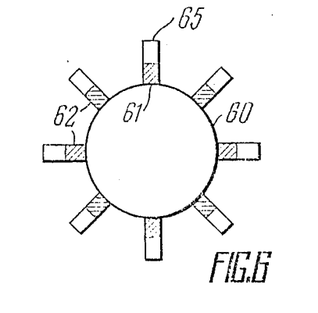
FIG. 6 is a section of line VI—VI of FIG. 5, in a plan view.

The discharge electrodes 50 are provided each in the form of at least two identical cylindrical sections 59 (FIG. 3) superimposed one above the other and rigidly attached to each othe at end faces. Each cylindrical section 59 (FIGS. 3, 4) of a discharge electrode 50 consists of two disks 60 which are aligned with each other and have rectangular strips 62 secured to the cylindrical surfaces with their inward edges 61 so as to make the same angle with each other. In contrast to the upper cylindrical elements which have rectangular strips 62, the strips 62 of the lower cylindrical section 59 (FIGS. 5, 6) are trapeziform.

Figures 7, 8, 9, 10:
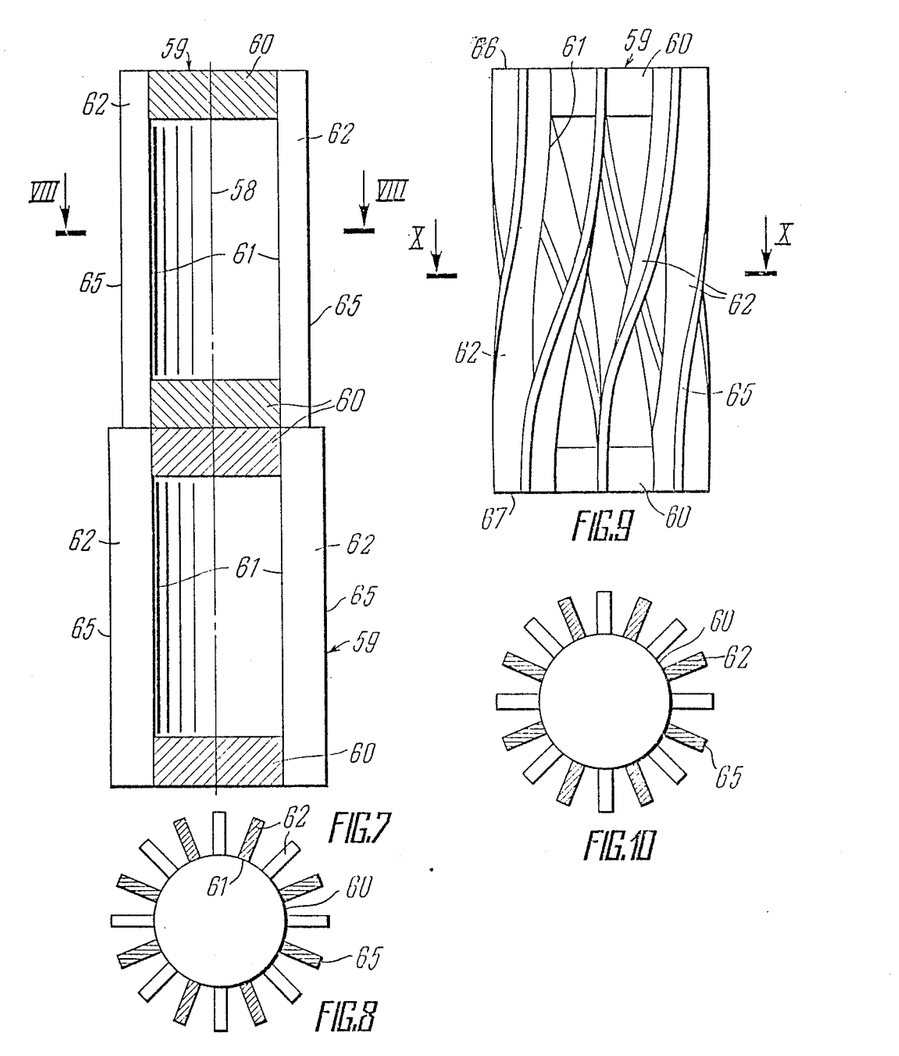
FIG. 7 is a sectional elevation of adjacent cylindrical sections of a discharge electrode of the electric precipitator according to the invention.
FIG. 8 is a section on line VIII—VIII of FIG. 7, in plan view.
FIG. 9 is a side view of a cylindrical section of a discharge electrode of the electric precipitator according to the invention in a second embodiment thereof.
FIG. 10 is a section on line X—X of FIG. 9, in a plan view.
Figure 11:
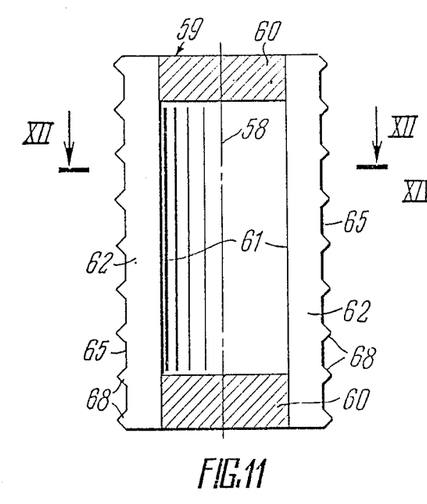
FIG. 11 is a sectional elevation of an upper cylindrical section of a discharge electrode of the electric precipitator with rectangular strips according to the invention in a third embodiment thereof.
Figure 12:
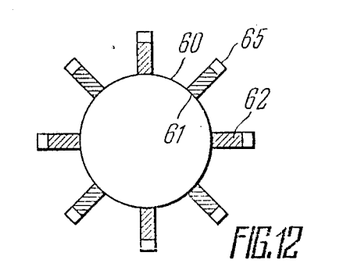
FIG. 12 is a section on line XII—XII of FIG. 11, in a plan view.

For a thorough intermixing of the gas stream and uniform distribution of the discharge down the entire length of a discharge and collecting electrode 50, 54, the strips 62 (FIGS. 7, 8) of adjacent cylindrical sections 59 are displaced relative to each other in a horizontal plane through an angle equalling half the angle between the strips 62.

To increase the field strength between the discharge and collecting electrodes 50, 54, the upper edges 63 (FIG. 2) of the discharge electrodes 50 are located below the upper edges 64 of the collecting electrodes 54 at a distance which is 1.7-2.0 times the distance between the cylindrical walls of the collecting electrodes 54 and the outward edges 65 (FIGS. 3, 4) of the rectangular strips 62 of the discharge electrodes 50.

To increase the field strength and breakdown voltage in the gap between the electrodes, the ratio of the diameter of a circle formed by the outward edges 65 of the rectangular strips 62 of the upper cylindrical sections 59 (FIGS. 3, 4) of the discharge electrodes 50 to the diameter of the collecting electrodes is 0.28-0.4.

Figure 3:
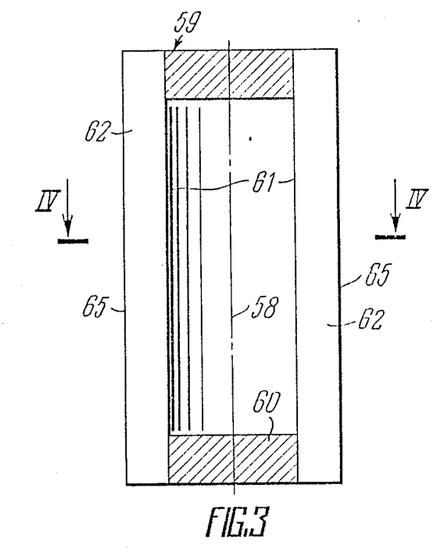
FIG. 3 is a sectional elevation of an upper cylindrical section of a discharge electrode of the electric precipitator according to the invention in a first embodiment thereof.
Figure 4:
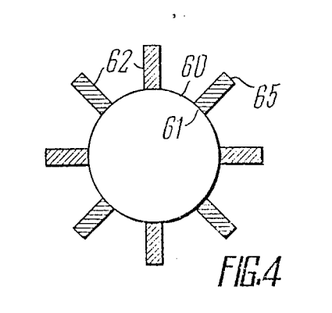
FIG. 4 is a section of line IV—IV of FIG. 3, in a plan view.

A ratio which is less than the lower limit of the above range weakens the strength of the field between the discharge and collecting electrodes 50, 54 and the cleaning efficiency is consequently reduced. a ratio exceeding the upper limit of the range decreases the breakdown voltage between the discharge and collecting electrodes 50, 54.

To obtain a discharge of uniform intensity over the entire length of the discharge and collecting electrodes 50, 54, the ratio of a distance of the inward edge of a rectangular strip of the upper cylindrical sections 59 of a discharge electrode 50 from the axis of the cylindrical sections 59, which is also the axis 58 of the discharge and collecting electrodes 50, 54, to a distance to the outward edge of the same strip from the same axis is 0.22-0.71.

In a second embodiment of the invention, the rectangular strips 62 (FIGS. 9, 10) of the upper cylindrical sections 59 of the discharge electrodes 50 are of a helical confiuration. In this case, an upper end 66 of each rectangular strip 62 is displaced relative to the lower end 67 of the same strip 62 through an angle which is greater than the angle formed by two adjacent rectangular strips 62.

Figure 13:
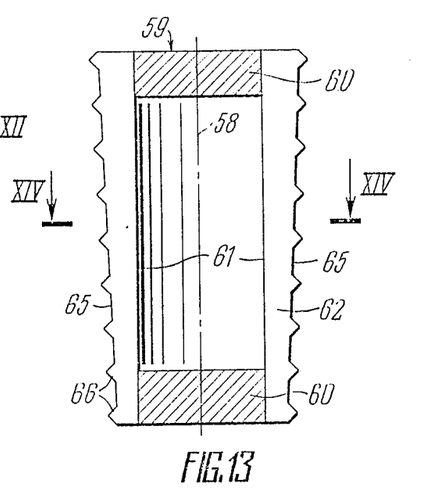
FIG. 13 is a sectional elevation of a lower cylindrical section of a discharge electrode of the electric precipitator according to the invention in the third embodiment thereof.
Figure 14:
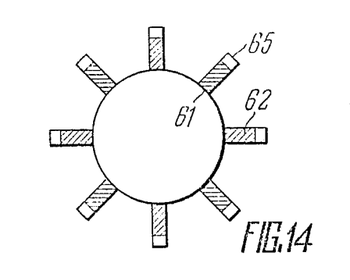
FIG. 14 is a section on line XIV—XIV of FIG. 13, in a plan view.

In a third embodiment of the invention adapted to clean gases with a high electric resistance, the outward eges 65 (FIGS. 11 through 14) of the strips 62 of the cylindrical sections 59 of the discharge electrodes 50 are serrated, whereby the pitch of the serrations 68 is 0.2-0.5 times the distance between the discharge and collecting electrodes 50, 54. The outward edges 65 (FIGS. 13, 14) of the trapeziform strips 62 of the lower cylindrical section 59 are also provided with serrations 68 the pitch whereof is 0.2-0.5 times the distance between the discharge and collecting electrodes 50, 54.

Figure 15:
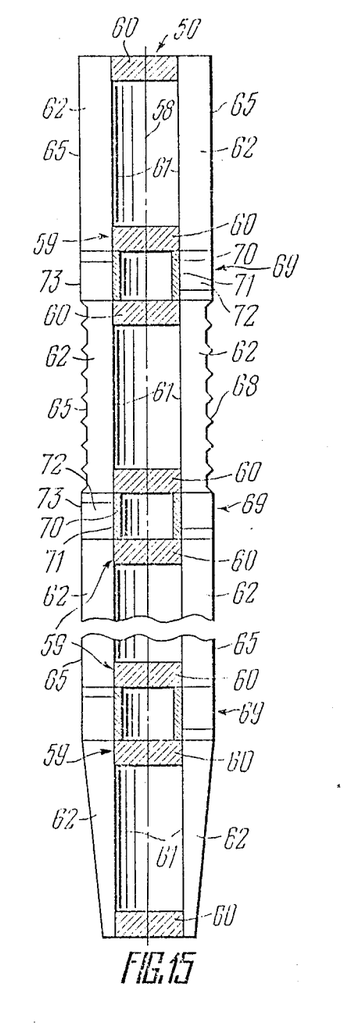
FIG. 15 is a sectional elevation of a discharge electrode of the electric precipitator according to the invention.
Figure 16:
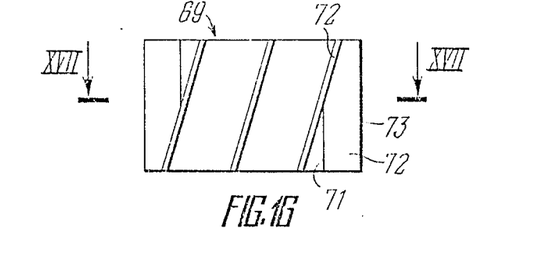
FIG. 16 is a side view of a vane-type vortex generator according to the invention.
Figure 17:
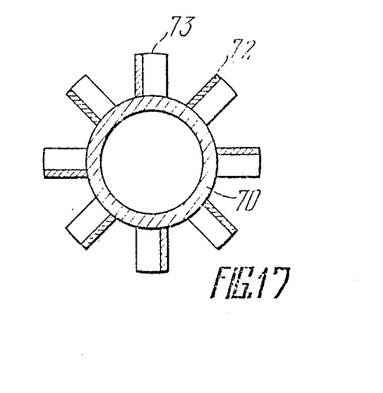
FIG. 17 is a section on line XVII—XVII of FIG. 16, in a plan view.

To achieve thorough intermixing of the gas stream, vane-type vortex generators 69 (FIG. 15) can be provided betwen the cylindrical sections 59 of the discharge electrodes 50. Each vane-type vortex generator 69 consits of a cylindrical rod 70 (FIGS. 16, 17) which is located in alignment with the cylindrical sections 59 and has vanes 72 attached with their inward edges 71 to the cylindrical surface, whereby the diameter of a circle formed by the outward edges 73 of the vanes 72 is less than the diameter of a circle formed by the outward edges 65 of the rectangular strips 62 of the cylindrical sections 59 of the discharge electrodes 50.

The method of cleaning gas from solid and gaseous matter is explained in considering the way in which the apparatus, which materializes this method, is operating.

Pursuant to the method of cleaning gas from solid and gaseous matter, a gas stream is scrubbed in two stages whereby a gas/liquid stream is formed, the gas/liquid stream is cooled, a liquid phase is separated from the gas/liquid mixture and disposed of.

Referring to FIG. 1, process gas containing suophur dioxide and trioxide, dust in an amount of up to $2 g/m^3$, fumes of arsenic and selenium up to $1 g/m^3$ is admitted into the means 1 of scrubbing, which is a vertical scrubbing tower, through the inlet connection 3. A scrubbing liquid which is 5–10% sulphuric acid with a temperature of 40° C. is admitted into the lower tower through the nozzles 9 spaced eqiudistantly apart all the way along the perimeter of the side wall 4. The gas stream and scrubbing liquid travel in a cocurrent flow. The gas stream leaving the convergent cone 7 at a velocity of 30–40 m/s progresses at this velocity up to the contact with the jets issuing from the nozzles 9. In mixing with the gas stream, the scrubbing liquid is atomized into fine droplets so that the surface of contact between the two phases, gaseous and liquid one, increases.

During the first-stage scrubbing of the gas in the means 1, the gas stream cools down to the temperature of its adiabatic saturation and becomes saturated with vapour of the scrubbing liquid. If the velocity of the gas stream is less than 30 m/s, it cannot properly atomize the scrubbing liquid. The surface of contact between the two phases is small, and the temperature of the gas is above that of its adiabatic saturation. The sulphur trioxide contained in the gas is converted into sulphuric acid mist during the first-stage scrubbing in the means 1. The bulk of solids (70–80%) with a particle size over 2 μm, which is the carry-over of metallurgical plants, are absorbed by the droplets of scrubbing liquid. The fumes of arsenic and selenium become condensed. A small fraction of the arsenic fumes is absorbed by the droplets of scrubbing liquid. The bulk of the fumes of arsenic and selenium pass over into the sulphuric acid mist.

The droplets of scrubbing liquid with the absorbed matter are collected in the tank 6 for liquid mixture.

The second-stage means 2 of gas scrubbing admitted whereinto is the gas stream is the Venturi tube. Passing through the neck 17 of the scrubbing means 2, the gas stream accelerates to 50–70 m/s. Scrubbing liquid is fed into the neck 17 through the nozzles 19 at a temperature of 40°–50° C. The scrubbing process in the means 2 is a co-current one. The gas cools down to 40°–50° C. and makes up with the scrubbing liquid in the neck 17, the surface of contact between the gaseous and liquid phases increases. The rest of solid particles and some of the sulphuric acid mist are catched by the droplets of scrubbing liquid in the scrubbing means 2. In the divergent cone 18 of the scrubbing means 2, the droplets of scrubbing liquid catch the solid and liquid particles of unwanted matter, and grow in size. The same occurs with the droplets of sulphuric acid mist. In the mist-eliminating tank 21, the droplets of scrubbing liquid are separated from the gas stream due to inertia and drip into the tank 22 for liquid mixture. The gas leaving the scrubbing means 2 through the outlet connection 24 is conveyed over the pipe 32 to the electric precipitator 25, entering this through the inlet connection 28. In the electric precipitator 25 (FIG. 2), the gas at a temperature of 40°–50° C. is directed under the distributing grid 57 which distributes it uniformly over the volume of the housing of the precipitator 25. the ascending gas stream enters the electric field between the discharge and collecting electrodes 50, 54 where the field strength is 5–9 kV/cm. Splitting there so as to flow simultaneously inside and outside the cylindrical sections 59 of the discharge electrodes 50, the flow of gas/liquid mixture acquires a velocity of 3–4 m/s in the electric field between the discharge and collecting electrodes 50, 54.

A discharge set up between the collecting electrodes 54 and the outward edges 65 (FIGS. 3, 4) of the strips 62 of the discharge electrodes 50 brings about ionizations of the gas. The ions of the gas are absorbed by the solid particles, i.e. dust, and by the droplets of scrubbing liquid. The charged particles become separated from the gas stream and precipitate on the cylindrical surface of the collecting electrodes 54 (FIG. 2). With the ascending motion of the gas stream along the discharge and collecting electrodes 50, 54, its solids content decreases. At the same time, water with a temperature 8°–14° C. is admitted through the connection 55 into the air-tight space formed by the side wall 27 of the housing of the electric precipitator 25, the cylindrical walls of the collecting electrodes 54, the upper and lower perforated plates 52, 53. Fumes of arsenic and selenium condense on the surface of the collecting electrodes together with the droplets of scrubbing liquid containing dissolved gas to form a film of condensate which drips into the tank 34 for liquid mixture and is disposed of therefrom. Clean gas leaves the electric precipitator 25 over the connection 30 at a temperature of 30° C.

The fact that the upper edges 63 of the discharge electrods 50 are located below the upper edges 64 of the collecting electrodes 54 at a distance which is 1.7–2.0 times the distance between the cylindrical walls of the collecting electrodes 54 and the outward edges 65 (FIGS. 3, 4, 9, 10) of the rectangular strips 62 of the discharge electrode 50 permits a high field strength to be maintained in operation and prevents break-down of the discharge at sharp edges 64 of the collecting electrodes 54.

A shortening of the distance between the upper edges 63 of the discharge electrodes 50 and the upper edges 64 of the collecting electrodes 54 below the specified range reduces the break-down voltage in the gap between the electrodes. An extension of the above distance outside the specified range leads to a shrinkage of the effective electric field.

The cylindrical sections 59 of the discharge electrodes 50 which are provided in the form of two disks 60 with the strips 62 secured by their inward edges 61 to the cylindrical disk surfaces, whereby the ratio of the distance of the inward edges 61 from the axis of the cylindrical sections 59 to that of the outward edges 65 from the same axis is 0.22–0.71, promote the setting up of a strong discharge uniformly distributed over the length of the discharge and collecting electrodes 50, 54, intensify the mixing of the gas stream and stimulate the ionization of the gas at the inward and outward edges 61, 65 of the strips 62 of the discharge electrodes 50.

A reduction of the lower limit of the above ratios of the distances of the inward and outward edges 61, 65 of the rectangular strips 62 from the axis 58 of the discharge and collecting electrodes 50, 54 may bring about a break-down of the discharge between adjacent strips 62 of a discharge electrode 50. This decreases the field strength between the discharge and collecting electrodes 50, 54 and impairs the cleanliness of the gas.

An upper limit of the above ratios which exceeds the specified one may lead to a breakdown of the discharge between strips 62 of a discharge electrode 50 and the surface of the collecting electrode 54.

The serrations 68 provided on the outward edges 65 (FIGS. 11, 12) of the discharge electrodes 50 function as extra centres of the ionization taking place between the discharge and collecting electrodes 50, 54. If the pitch of the serrations 68 of the outward edges 65 of the strips 62 is less than 0.2 times the distance between the discharge and collecting electrodes 50, 54, a superposition of electric field lines — which increases power consumption — may take place. A pitch of the serrations 68 of the outward edges 65 of the strips 62 which is greater than 0.5 times the indicated distance, reduces the space charge of the electric field and, consequently, the efficiency of gas cleaning.

The vane-type vortex generators 69 (FIGS. 15 through 17) of the discharge electrodes 50 serve to mix the gas in a thorough way. The ascending gas streams passing along the strips 62 of the cylindrical sections 59 are deflected by the vanes 72 of the vortex generators 69 towards the collecting electrodes 54, thoroughly intermixing with each other.

The outflow of gas from the electric precipitator 25 (FIG. 1), which has a temperature of 30° C., is conveyed over the pipe 33 into the electric precipitator 26 for further cleaning from the fumes of arsenic and selenium and from the mist of sulphuric acid in the same way as described hereinabove. In cleaning, the gas is cooled to 20° C. The clean gas is fed to the drying and adsorbing department (not shown).

An example showing the way in which the disclosed method of cleaning gas from solid and gaseous matter has been implemented is as follows.

A process gas with a flow rate of 37,000m³/h, a temperature of 250° C. and containing emissions of dust (2 g/m³), sulphur dioxide (7%) and fumes of arsenic (1 g/m³) was scrubbed in a first-stage scrubbing tower with a 2% sulphuric acid at a temperature of 40° C. which was admitted in a cocurrent flow with the gas at a rate of 40 m³/h. The velocity of the gas during the scrubbing was 35 m/s and cooling to 60° C. took place. The second-stage scrubbing was carried out in a Venturi tube, using 2% sulphuric acid at 40° C. and in amount of 35 m³/h. The velocity of the gas during the scrubbing was 60 m/s, and the gas outflow temperature was 45° C.

The electric precipitation of the solid and gaseous matter was carried out in two successive electric precipitators operating each at a field strength of 8kV/cm. The gas velocity in the active cross-sectional area of the electric precipitators was 3 m/s. The content of the emissions in the outflow of clean gas from the electric precipitators at 20° C. was as follows:
dust, traces;
arsenic, traces;
sulphuric acid mist, g/m³, 0.05.

The disclosed method of cleaning gas from solid and gaseous matter provides for a cleanliness of at least 99.8%. It also permits the cleaning of a gas with a variable content and flow rate. The apparatus which materializes the disclosed method of cleaning gas from solid and gaseous matter saves metal.

What is claimed is:

1. A method of cleaning gas from solid and gaseous matter pursuant whereto a gas stream is scrubbed in a first stage and in a second stage of scrubbing with a liquid in a cocurrent flow, whereby a stream of gas/liquid mixture is formed; said stream of gas/liquid mixture is cooled in the course of said scrubbing of the gas stream with the liquid, a liquid phase is separated from said stream of gas/liquid mixture which contains solid mater present in the gas, and the liquid phase is disposed of; in the course of scrubbing the gas stream with the liquid, said gas stream is admitted into said first stage of scrubbing with said liquid at a velocity of 30–40 m/s and said gas is being cooled to the temperature of its adiabatic saturation; for said second stage of scrubbing the gas stream with the liquid, said stream of gas/liquid mixture is admitted at a velocity of 50–70 m/s and said gas is coold to 40°–50° C.; said solid and gaseous matter contained in the gas is electrically precipitated at a field strength of 5–9 kV/cm, whereby the velocity of said stream of gas/liquid mixture is 3–4 m/s in passing through said electric field; said gas is cooled to 20°–25° C. in the course of said electrostatic precipitation of said solid and gaseous matter present in the gas.

2. An apparatus for materializing the method of cleaning gas from solid and gaseous matter which comprises a first means of scrubbing the gas carried out wherein is a first stage of scrubbing the gas with a liquid, said means being located upstream of the rest of units passing wherethrough is the gas stream and being provided in the form of a scrubbing tower; said scrubbing tower having an upper and lower end faces and a side wall; a connection admitted wherethrough into said scrubbing tower is the gas, which is located in said upper end face of said scrubbing tower; a connection for discharging the gas from said scrubbing tower, which is located in a lower part of said side wall of said scrubbing tower; a convergent cone of said scrubbing tower having a lower edge, which is located in an upper part of said scrubbing tower and is attached to the side wall of said scrubbing tower; nozzles admitted wherethrough into said scrubbing tower is the scrubbing liquid, which are attached to the side wall of said scrubbing tower above said lower edge of said convergent cone and are directed downwards so as to make acute angles with a horizontal plane;

a second means of scrubbing the gas carried out wherein is a second stage of scrubbing the gas with the liquid which is located downstream of said first means of scrubbing and is provided in the form of a Venturi tube having an upper and lower end faces and a side wall; a connection admitted wherethrough into said Venturi tube is the gas, said connection being located at said upper end face of said Venturi tube and connected — through a common fluid stream — to said connection for discharging the gas from said scrubbing tower; a connection admitted wherethrough into said Venturi tube is the scrubbing liquid, which is located in said upper end face of said Venturi tube; a connection discharged wherethrough from said Venturi tube is the gas which is located in a lower part of said Venturi tube;

at least one electric precipitator; a housing of each said electric precipitator having a lower and an upper part and a side wall; a connection admitted wherethrough into said electric precipitator is the gas which is located in the lower part of said housing of said electric precipitator and is connected by a common fluid stream to said connection discharged wherethrough from said Venturi tube is the gas; a connection discharged wherethrough from said electric precipitator is the gas which is located in the upper part of said housing of said electric precipitator; a frame of said electric precipitator which is located in said upper part of the housing of said electric precipitator and is electrically connected to a source of power; an upper perforated plate of said electric precipitator which is attached to the upper part of said side wall of the housing of said electric precipitator; a lower perforated plate of said electric precipitator which is attached to the lower part of said side wall of the housing of said electric precipitator; earthed collecting electrodes of said electric precipitator which have longitudinal axes, cylindrical walls, upper and lower edges, are shaped as hollow cylinders and interposed vertically between said upper and lower perforated plates so that a distance between said longitudinal axes of said collecting electrodes is 1.2–1.5 times the diameter of the collecting electrodes; said collecting electrodes of said electric precipitator which are secured to said upper and lower perforated plates; said upper and lower perforated plates and said collecting electrodes of said electric precipitator which are secured so that an air-tight space filled with a cooling agent is formed between said side wall of said housing, said cylindrical walls of said collecting electrodes and said upper and lower perforated plates; a connection admitted wherethrough is the cooling agent of said electric precipitator which is located in said side wall of the housing of said electric precipitator between said upper and lower perforated plates; a connection discharged wherethrough is the cooling agent of said electric precipitator which is located in said side wall of said housing of said electric precipitator between said upper and lower perforated plates; discharge electrodes of said electric precipitator having upper edges, cylindrical upper parts and conical lower parts, whereby said discharge electrodes are electrically connected to said frame and suspended therefrom inside said collecting electrodes in coaxial positions therewith; at least two separate identical cylindrical sections of said discharge electrodes of said electric precipitator which have end faces and a side wall, are located one above the other and rigidly interconnected at said end faces; rectangular strips of said discharge electrodes of said electric precipitator having inward and outward edges, whereby said rectangular plates are secured with their inward edges to said side wall of said upper cylindrical sections so as to form the same angle with each other; trapeziform strips of said discharge electrodes of said electric precipitator having inward and outward edges, whereby said trapeziform strips are secured with their inward edges to said side wall of said lower cylindrical section so as to form the same angle with each other; said rectangular and trapeziform strips of said discharge electrodes of said electric precipitator which are secured to said adjacent cylindrical sections so as to be displaced relative to each other in a horizontal plane; said upper edges of said discharge electrodes of said electric precipitator which are located below said upper edges of said collecting electrodes at a distance 1.7–2.0 times the distance between said cylindrical walls of said collecting electrodes and said outward edges of said rectangular strips of said discharge electrodes.

3. An apparatus as claimed in claim 2, wherein
said rectangular and trapeziform strips of said discharge electrodes of said electric precipitator, which are attached to said adjacent cylindrical sections of said discharge electrodes, are displayed relative to each other in a horizontal plane through an angle equalling half the angle said strips make with each other.

4. An apparatus as claimed in claim 2, wherein
the ratio of the diameter of a circle formed by said outward eges of the rectangular strips of discharge electrodes of said electric precipitator, which are attached to the upper cylindrical sections of said discharge electrodes, to the diameter of said collecting electrodes of said electric precipitator is 0.28–0.84.

5. An apparatus as claimed in claim 3, wherein
the ratio of the diameter of a circle formed by said outward edges of the rectangular strips of discharge electrodes of said electric precipitator, which are attached to said upper cylindrical sections of said discharge electrodes, to the diameter of said collecting electrodes of said electric precipitator is 0.28–0.84.

6. An apparatus as claimed in claim 2, incorporating
— each said cylindrical section of said discharge electrodes of said electric precipitator which has an axis and is provided in the form of two disks, said disks of each said cylindrical section of said discharge electrodes of said electric precipitator which have each a cylindrical surface and are aligned with each other, said rectangular and trapeziform strips of said discharge electrodes which have inward and outward edges and are attached with their inward edges to said cylindrical surfaces of said disks;
the ratio of a distance of said inward edges of rectangular strips of said discharge electrodes from the axis of said cylindrical sections of said discharge electrodes to a distance of said outward edges of a rectangular strips of said discharge electrodes from said axis is 0.22–0.71.

7. An apparatus as claimed in claim 3, incorporating
each said cylindrical section of said discharge electrodes of said electric precipitator which has an axis and is provided in the form of two disks, said disks of each said cylindrical section of said discharge electrodes of said electric precipitator which have each a cylindrical surface and are aligned with each other, said rectangular and trapeziform strips of said discharge electrodes which have inward and outward edges and are attached with their inward edges to said cylindrical surfaces of said disks;
the ratio of a distance of said inward edges of rectangular strips of said discharge electrodes from the axis of said cylindrical sections of said discharge electrodes to a distance of said outward edges of rectangular strips of said discharge electrodes from said axis is 0.22–0.71.

8. An appartus as claimed in claim 2, incorporating
each said cylindrical section of said discharge electrodes of said electric precipitator which has an axis and is provided in the form of two disks, said disks of each said cylindrical section of said discharge electrodes of said electric precipitator which have each a cylindrical surface and are aligned with each other, said rectangular and trapeziform strips of said discharge electrodes which have inward and outward edges and are attached with their inward edges to said cylindrical surfaces of said disks;

the ratio of a distance of said inward edges of rectangular strips of said discharge electrodes from the axis of said cylindrical sections of said discharge electrodes to a distance of said outward edges of rectangular strips of said discharge electrodes from said axis is 0.22–0.71.

9. An apparatus as claimed in claim 2, wherein
said outward edge of said rectangular and trapeziform strips of discharge electrodes of said electric precipitator is provided with serrations the pitch whereof is 0.2–0.5 times the distance between said collecting and discharge electrodes of said electric precipitator.

10. An apparatus as claimed in claim 3, wherein
said outward edge of said rectangular and trapeziform strips of discharge electrodes of said electric precipitator is provided with serrations the pitch whereof is 0.2–0.5 times the distance between said collecting and discharge electrodes of said electric precipitator.

11. An apparatus as claimed in claim 4, wherein
said outward edge of said rectangular and trapeziform strips of discharge electrodes of said electric precipitator is provided with serrations the pitch whereof is 0.2–0.5 times the distance between said collecting and discharge electrodes of said electric precipitator.

12. An apparatus as claimed in claim 6, wherein
said outward edge of said rectangular and trapeziform strips of discharge electrodes of said electric precipitator is provided with serrations the pitch whereof is 0.2–0.5 times the distance between said collecting and discharge electrodes of said precipitator.

13. An apparatus as claimed in claim 2, incorporating vane-type vortex generators of said discharge electrodes of said electric precipitator which are located between said cylindrical sections of discharge electrodes, a cylindrical rod of each said vane-type vortex generator which has a cylindrical surface and is located in alignment with said cylindrical sections of discharge electrodes, vanes of each said vane-type vortex generator which have inward and outward edges and are attached with their inward edges to said cylindrical surface of said cylindrical rod;

the diameter of a circle formed by said outward edges of said vanes of said vane-type vortex generators is less than the diameter of a circle formed by said outward edges of rectangular strips of said cylidrical sections of said discharge electrodes.

14. An apparatus as claimed in claim 3, incoroporating - vane-type vortex generators of said discharge electrodes of said electric precipitator which are located between said cylindrical sections of discharge electrodes, a cylindrical rod of each said vane-type vortex generator which has a cylindrical surface and is located in alignment with said cylindrical sections of discharge electrodes, vanes of each said said vane-type vortex generator which have inward and outward edges and are attached with their inward edges to said cylindrical surface of said cylindrical rod;

the diameter of a circle formed by said outward edges of said vanes of said vane-type vortex generators is less than the diameter of a circle formed by said outward edges of rectangular strips of said cylindrical sections of said discharge electrodes.

15. An apparatus as claimed in claim 4, incorporating - vane-type vortex generators of said discharge electrodes of said electric precipitator which are located between said cylindrical sections of discharge electrodes, a cylindrical rod of each said vane-type vortex generator which has a cylindrical surface and is located in alignment with said cylindrical sections of discharge electrodes, vanes of each said vane-type vortex generator which have inward and outward edges and are attached with their inward edges to said cylindrical surface of said cylindrical rod;

the diameter of a circle formed by said outward edges of said vanes of said vane-type vortex generators is less than the diameter of a circle formed by said outward edges of rectangular strips of said cylindrical sections of said discharge electrodes.

16. An apparatus as claimed in claim 6, incorporating - vane-type vortex generators of said discharge electrodes of said electric precipitator which are located between said cylindrical sections of discharge electrodes, a cylindrical rod of each said vane-type vortex generator which has a cylindrical surface and is located in alignment with said cylindrical sections of discharge electrodes, vans of each said vane-type vortex generator which have inward and outward edges and are attached with their inward edges to said cylindrical surface of said cylindrical rod;

the diameter of a circle formed by said outward edges of said vanes of said vane-type vortex generators is less than the diameter of a circle formed by said outward edges of rectangular strips of said cylindrical sections of said discharge electrodes.

17. An apparatus as claimed in claim 9, incorporating vane-type vortex generators of said discharge electrodes of said electric precipitator which are located between said cylindrical sections of discharge electrodes, a cylindrical rod of each said vane-type vortex generator which has a cylindrical surface and is located in alignment with said cylindrical sections of discharge electrodes, vanes of each said vane-type vortex generator which have inward and outward edges and are attached with their inward edges to said cylindrical surface of each said cylindrical rod;

the diameter of a circle formed by said outward edges of said vanes of said vane-type vortex generators is less than the diameter of a circle formed by said outward edges of rectangular strips of said cylindrical sections of said discharge electrodes.

* * * * *